(12) United States Patent
Chang et al.

(10) Patent No.: US 7,516,296 B2
(45) Date of Patent: Apr. 7, 2009

(54) FLASH MEMORY STORAGE DEVICE AND READ/WRITE METHOD

(75) Inventors: Chi-Tung Chang, Taipei (TW); Chia-Wei Hou, Taipei (TW); Kuo-Hsiang Hsu, Taipei (TW); Wen-Hao Cheng, Taipei (TW)

(73) Assignee: Alcor Micro, Corp., Taipei (TW)

( * ) Notice: Subject to any disclaimer, the term of this patent is extended or adjusted under 35 U.S.C. 154(b) by 360 days.

(21) Appl. No.: 11/581,430

(22) Filed: Oct. 17, 2006

(65) Prior Publication Data

US 2008/0010431 A1 Jan. 10, 2008

(30) Foreign Application Priority Data

Jul. 7, 2006 (TW) .............................. 95124982 A

(51) Int. Cl.
G06F 12/06 (2006.01)
(52) U.S. Cl. ...................................... 711/202; 711/103
(58) Field of Classification Search ........................ None
See application file for complete search history.

(56) References Cited

U.S. PATENT DOCUMENTS

| | | | |
|---|---|---|---|
| 2005/0144368 A1* | 6/2005 | Chung et al. | 711/103 |
| 2006/0212674 A1* | 9/2006 | Chung et al. | 711/202 |
| 2007/0300008 A1* | 12/2007 | Rogers et al. | 711/103 |
| 2008/0091901 A1* | 4/2008 | Bennett et al. | 711/165 |

* cited by examiner

Primary Examiner—Than Nguyen
(74) Attorney, Agent, or Firm—Rosenberg, Klein & Lee

(57) ABSTRACT

A memory storage device and a read/write method thereof, first defining logically the flash memory as at least one particular data management area and at least one common data management area; next, determining the logical block address located in the particular data management area or the common data management area according to data transmitted to an external system by an area decision mechanism, wherein the method of writing to the particular data management area is by using a method of dynamic deviation value, and the method of writing to the common data management area is by using a method of same displacement value. Whereby, the particular data management area can be avoided moving frequently caused by updating data from the external system to improve read/write performance of the flash memory.

20 Claims, 9 Drawing Sheets logical block X

| logical page address | 0 | 1 | 2 | 3 | 4 | ...... | M-2 | M-1 | M |
|---|---|---|---|---|---|---|---|---|---|
| physical page address of memory block #1 | | 3 | M-1 | | | ...... | 0 | | 2 |
| physical page address of memory block #2 | 1 | | | 0 | 10 | ...... | | M-1 | |

FIG. 4A

FLASH MEMORY STORAGE DEVICE AND READ/WRITE METHOD

BACKGROUND OF THE INVENTION

1. Field of the Invention

The invention relates to a memory storage device and a read/write method thereof, and more particularly to a memory storage device and a read/write method for improving efficiency thereof.

2. Description of the Prior Art

Recently with the rapidly development of computer, communication, and consumer electronic, it is almost a prerequisite function of being media of storing data by the build-in flash memory or accessing the external memory card. Hence, the speed of reading and writing the storage media is an important consideration when the users purchase these 3C products because the frequency and quantity of accessing the data are increased day by day.

There are some advantages of the flash memory such as small size, great capacity, low consumption, non-volatile property, enduring vibration, and etc., however, there are two electric limitations of without directly rewriting and limitation of erasing times. Wherein "without directly rewriting" means that the data sector in the original position has to be erased before the new data are stored so that the new data can be rewritten. In addition, the time of erasing operation and resetting all of the memory units is longer than that reading or writing operation. Take TOSHIBA TH58NVG1S3AFT05 2 Gbit for example, its reading time is 50 ns, writing time is 200 us, but erasing time is up to 2 ms.

Reference is shown as in FIG. 1 which is a schematic view of an architecture of a flash memory applied according to the prior art. An external system 10 of the host send a logic block address to a control unit 20 to record the logical block address and the physical block address in the flash memory 30 according to a logical/physical block address map table 2 after the control unit 20 communicates to a flash memory 30. And the prior art can avoid searching all addresses from beginning to end for getting the related logical block address while accessing the data every time.

Reference is shown as in FIG. 2 which is a schematic view of a relation between a physical block address and a logical block address in a flash memory and a logical/physical block address map table built by the relation according to the prior art. The logical/physical block address map table 21 is built after the system is booted and a SRAM can be designed to store and record the logical/physical block address map table 21 so as to find rapidly the physical block address is corresponded to the logical block address as long as searching the logical/physical block address map table 21 in the SRAM. For the flash memory 30, the writing time is longer than the reading time and it has to consider whether the written address has been filled or not when the data are written in the flash memory 30. If the written address has been filled, the data written from the external system 10 have to be written to a new available free space, and move the data in the original block address to the new block and update the logical/physical block address map table 21 so that the physical block address can be mapped by the logical block address.

In the flash memory specification, however, the relation between the physical block address and the logical block address isn't linear so that it doesn't obtain directly the logical block address according to the physical block address. Hence, it has to collect the data in original written block address before the data in the flash memory 30 are moved, and update the logical/physical block address map table 21 to be designated to the new physical block address after the data are moved. For the above-mentioned reason, if the operations of collecting, moving and address-designating are more frequent, it will increase the times of erasing, moving, and writing so as to influence the whole efficiency.

The inventor of the present invention recognizes the above shortage should be improved and special effort has been made to research this field. The present invention is presented with reasonable design to resolve the above problems.

SUMMARY OF THE INVENTION

The primary object of the present invention is to provide a memory storage device and a read/write method thereof, whereby distinguishing data transmitted to an external system into particular data contents and common data contents to be processed by using different accessing methods to, hence, a particular data management area is used to avoid moving frequently data due to updating of the external system often so as to promote read/write efficiency of the flash memory.

To achieve the primary objective stated above, a memory storage device is adapted to read/write data with an external system comprises a flash memory and a control unit. The flash memory is adapted to store the read/written data and further comprise a plurality of memory blocks, each of the memory blocks has a plurality of memory pages, and the memory blocks are distinguished into at least one particular data management area and at least one common data management area in logical block address. The control unit further comprises an area map table is adapted to map the logical block addresses and physical block addresses of the memory blocks and a plurality of page map tables are produced by each of the memory blocks and adapted to relate the logical block addresses and the physical block addresses of the memory pages. Wherein the control unit writes data to the memory pages of the memory blocks in the particular data management area according to the area map table and the corresponding page map tables by using a method of dynamic deviation value, and updates the corresponding area map table and the page map tables to be read and written later.

To achieve the primary objective stated above, a write method of a memory storage device, wherein the memory storage device comprises a flash memory, and the flash memory has a plurality of memory blocks and each of the memory blocks has a plurality of memory pages, comprises the steps: first, defining logically the flash memory as at least one particular data management area and at least one common data management area; next, accessing a logical block address of new written data; next, determining the logical block address located in the particular data management area or the common data management area by an area decision mechanism; next, determining whether the logical block address continued to a last accumulated address where the previous data written or not if the logical block address located in the particular data management area; next, determining further whether a corresponding stack block is filled or not if the logical block address continued to the last accumulated address where the previous data written; next, arranging and fetching data of the stack block to another new stack block, acquiring the latest accumulated address of the new stack block according an area map table and a corresponding page map table to write the new written data to the physical block address corresponded to the latest accumulated address by using a method of dynamic deviation value, and updating the area map table and the page map tables if the corresponding stack block is filled; next, acquiring directly the latest accumulated address according to the area map table and the corresponding page map tables, writing directly the new written data to the physical block address corresponded to the latest accumulated address by using a method of dynamic deviation value, and updating the area map table and the page map tables if the corresponding stack block isn't filled.

To achieve the primary objective stated above, a read method of a memory storage device wherein the memory storage device comprises a flash memory, the flash memory has a plurality of memory blocks and each of the memory blocks has a plurality of memory pages, and the flash memory is defined logically as at least one particular data management area and at least one common data management area, comprising the steps: first, accessing a logical block address of a read data; next, determining the logical block address located in the particular data management area or the common data management area by an area decision mechanism; next, determining whether the logical block address conformed to a address of a last memory page where the previous data written or not if the logical block address located in the particular data management area; next, determining further whether the logical block address exceeded a last sector address of the last memory page or not if the logical block address conformed to the address of the last memory page where the previous data written; next, acquiring a physical page address of the old memory page according to a area map table and a corresponding page map table, and reading out the data in the physical block of the old memory page if the logical block address is exceeded the last sector address of the last memory page to mean that the read data located in the logical block address of a old memory page; and next, acquiring a physical page address of the new memory page according to the area map table and the corresponding page map table, and reading out the data in the physical block of the new memory page if the logical block address isn't exceeded the last sector address of the last memory page to mean that the read data located in a new memory page.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which:

FIG. 4A is a schematic view of a page map table applied according to the present invention;

The drawings will be described further in connection with the following detailed description of the present invention.

DETAILED DESCRIPTION OF THE PREFERRED EMBODIMENTS

Figures 1, 2:
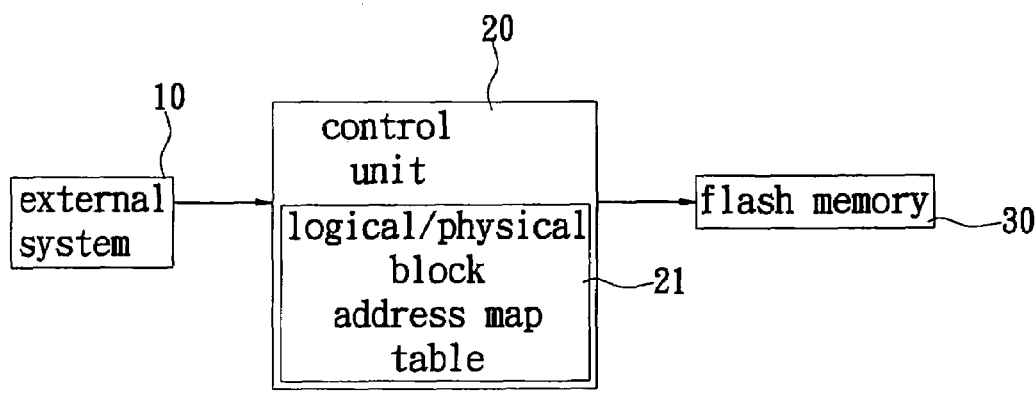
FIG. 1 is a schematic view of an architecture of a flash memory applied according to the prior art.
FIG. 2 is a schematic view of a relation between a physical block address and a logical block address in a flash memory and a logical/physical block address map table built by the relation according to the prior art.
Figure 3A:
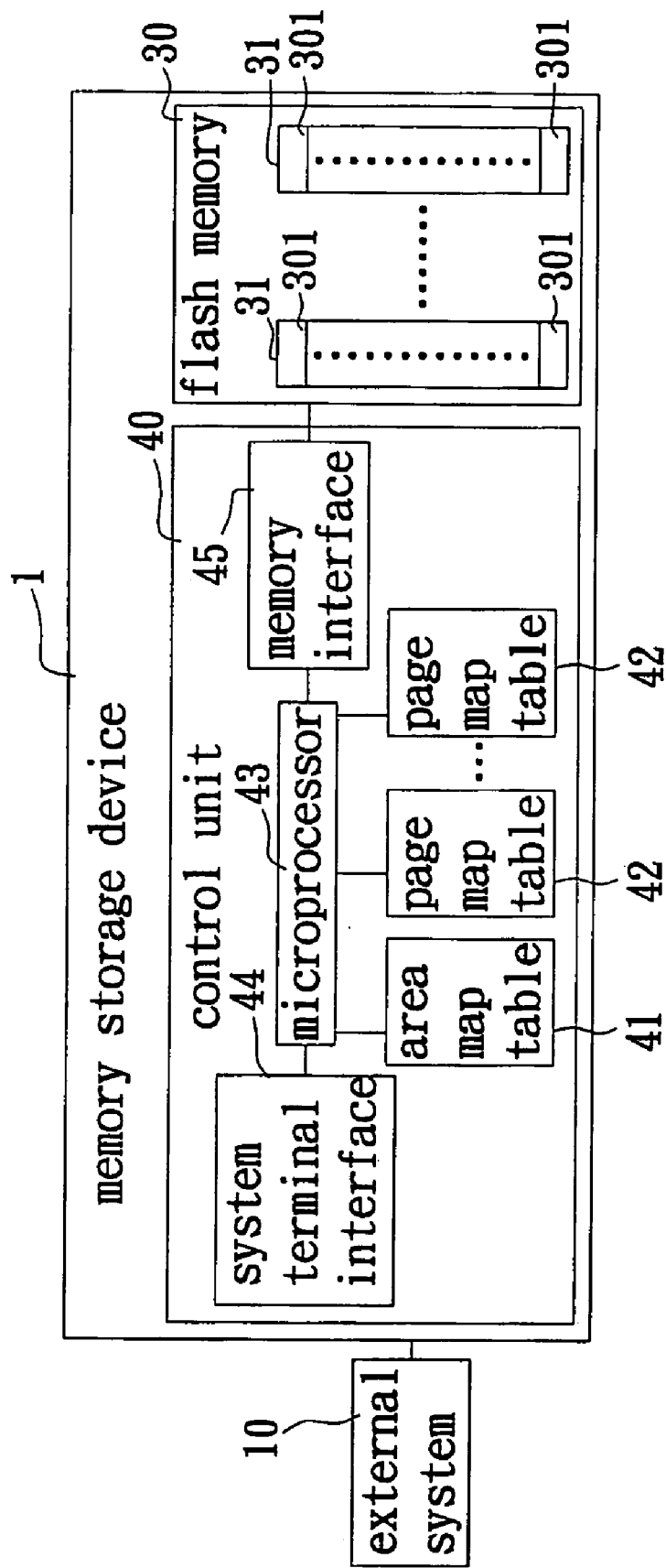
FIG. 3A is a block diagram of a preferred embodiment of a memory storage device according to the present invention.
Figure 3B:
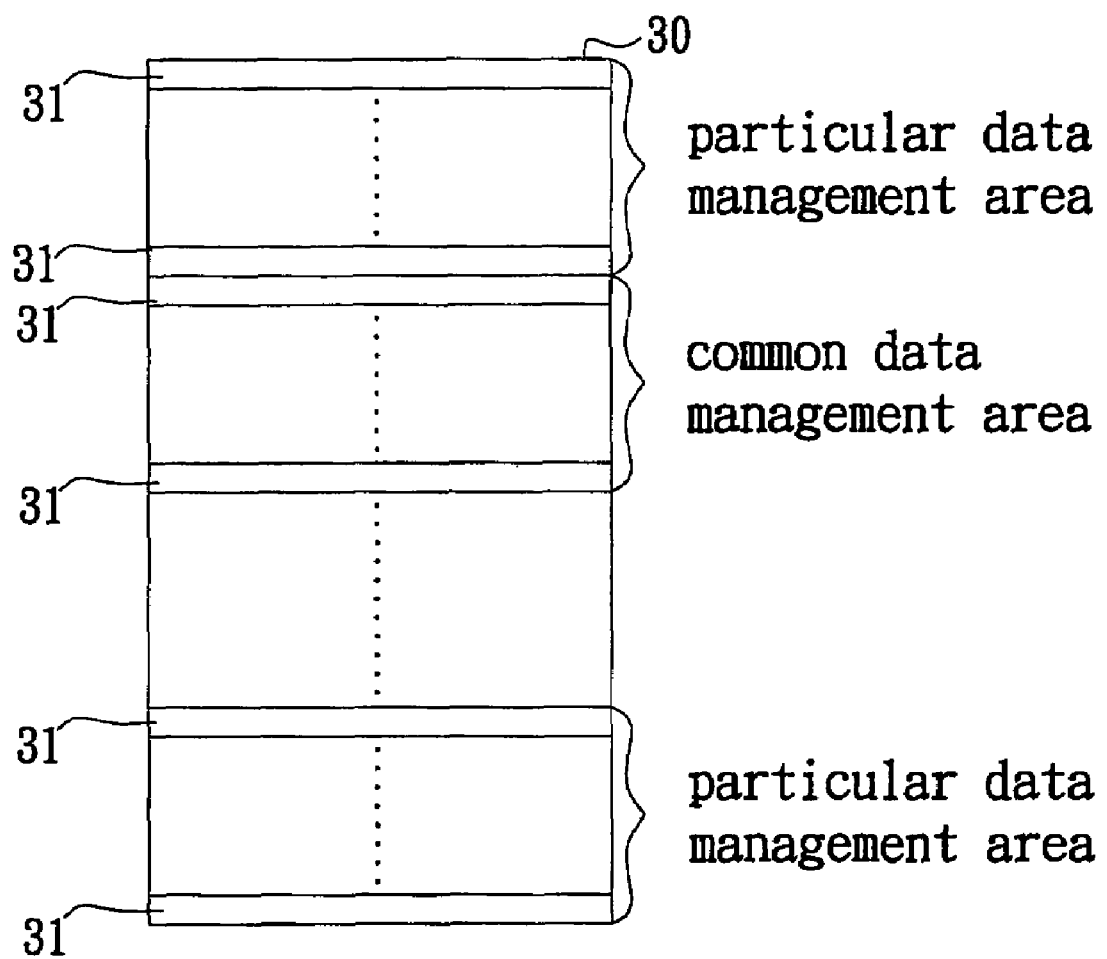
FIG. 3B is a schematic view of an architecture of a flash memory applied according to the present invention.

References are shown as in FIG. 3A and FIG. 3B which is separately a block diagram of a preferred embodiment of a memory storage device and a schematic view of an architecture of a flash memory applied according to the present invention. The memory storage device 1 is adapted to read/write data with an external system 10 and comprises a flash memory 30 and a control unit 40. The flash memory 30 is adapted to store the read/write data and has a plurality of memory blocks 31, each of the memory blocks has a plurality of memory pages 301, and the memory blocks 31 are distinguished into at least one particular data management area and at least one common data management area in logical block address (as shown in FIG. 3B). Practically, the memory blocks 31 of the particular data management area and the common data management area are used together in physical block addresses of the flash memory 30, and the two data management areas aren't used in regular sequence. In general, the particular data management area is used to process the data are read and moved frequently, and oppositely the common data management area is used to process the data are read and moved infrequently.

The control unit 40 further comprises an area map table 41, a plurality of page map tables 42, and a microprocessor 43. The area map table 41 is adapted to map the logical block address and the physical block address of the memory blocks 31, and each of the memory blocks 31 has respectively a page map table 42 for relating between the logical block address and the physical block address of the memory blocks 301. The control unit 40 further has a system terminal interface is used to transmit data between the control unit 40 and the external system, a memory interface 45 is a data transmission channel between the control unit 40 and the flash memory 30, and the microprocessor 43 is used to execute relative operations of reading, writing, and erasing according to the area map table 41 and the page map tables 42. Particularly, not only the area map table 41 is used but also the page map tables 42 are used to map address for processing the data are written by using a method of dynamic deviation value in the memory block 31 when the particular data management area is processed so as to reduce the frequency of origination for the memory block 31 by updating data from the external system 10.

Thus it can be seen, the control unit 40 writes data to the memory pages 301 of the memory block 31 of the particular data management area according to the area map table and the corresponding page map tables by using a method of dynamic deviation value, and next to update the connection relation between the area map table 41 and the page map tables 42. In opposition, the control unit 40 writes data to the memory blocks in the common data management area by using a method of same displacement value according to the area map table 41, and to update the connection relation of the area map table 41.

Figure 4B:
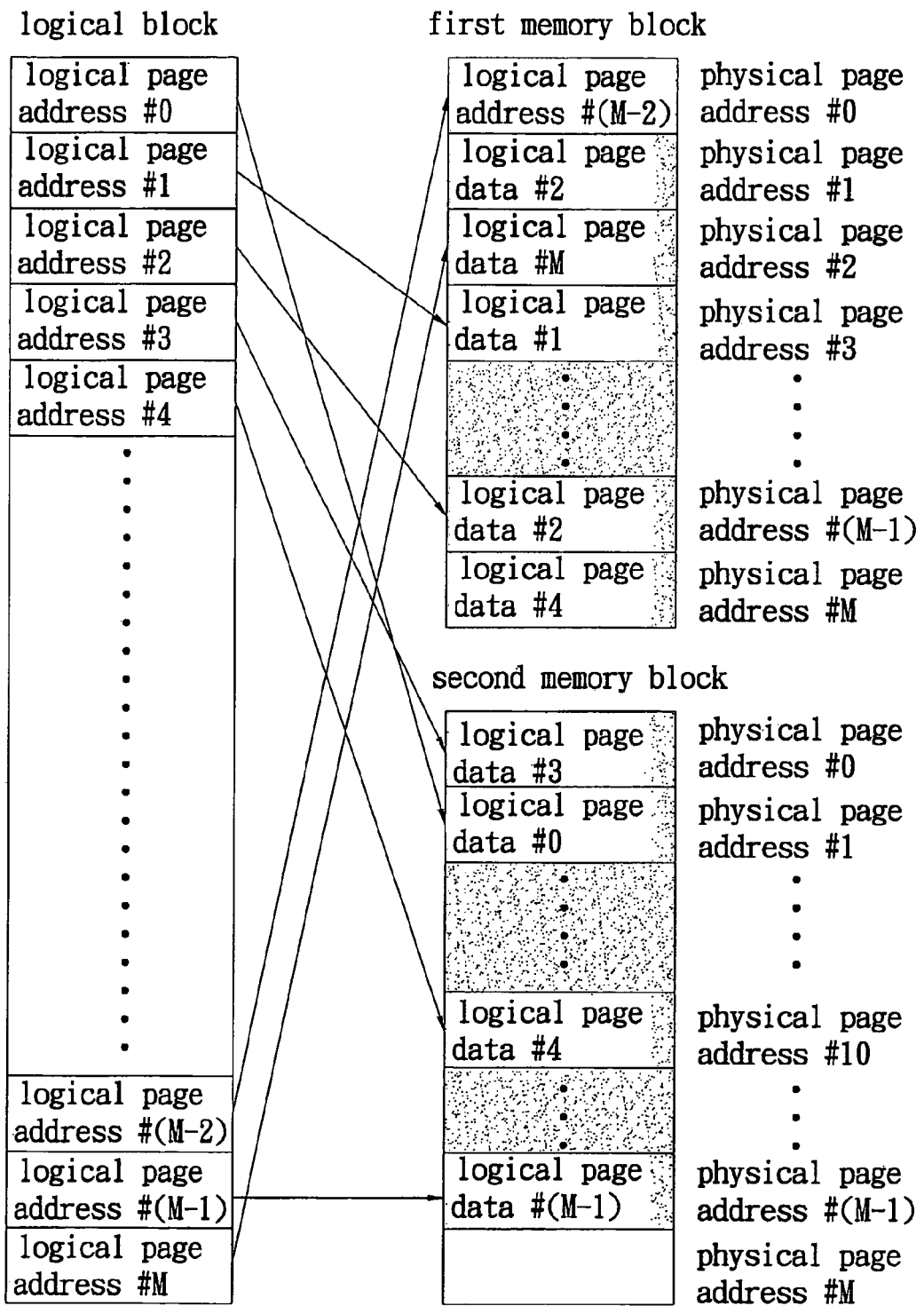
FIG. 4B is a schematic view of a relation between a logical page address corresponded by the page map table and a physical page address according to the present invention.

References are shown as in FIG. 4A and FIG. 4B which are separately a schematic view of a page map table applied and a schematic view of a relation between a logical page address corresponded by the page map table and a physical page address according to the present invention. In the particular data management area, at least one memory block 31 taken as a unit to map a logical block, and two memory blocks 32 taken for example to explain in the present invention. The page map table 42 divided mainly into column of logical page address and column of physical page address, and connection relation between the two columns will be updated according to different logical block address outputted from the external system 10. In the FIG. 4B, the physical block address in two memory blocks 31 taken as a first memory block and a second memory block for example to explain. The data are written by using a method of dynamic deviation value in the first memory block for a start, and next written in the second memory block when the first memory block is filled. If the two memory blocks 31 are filled, another new first memory block is used and another new second memory block is defined to accompany. The logical page address of the logical block address outputted from the external system 10 may be repeated, hence, there are same data of data page are located in the memory block 31. At this time, the logical page address is designated in a newer data of the data page, and the page map tables 42 will update relation to remain newer data of the data page according to the relation of the page map tables 42.

In addition, a single logical page address of the page map tables 42 is not limited to correspond a single physical page address of the memory blocks 31, can be also corresponded to a plurality of physical page addresses to avoid occupying the storage space of the control unit 40 when more page map tables 42 are used.

Figure 5:
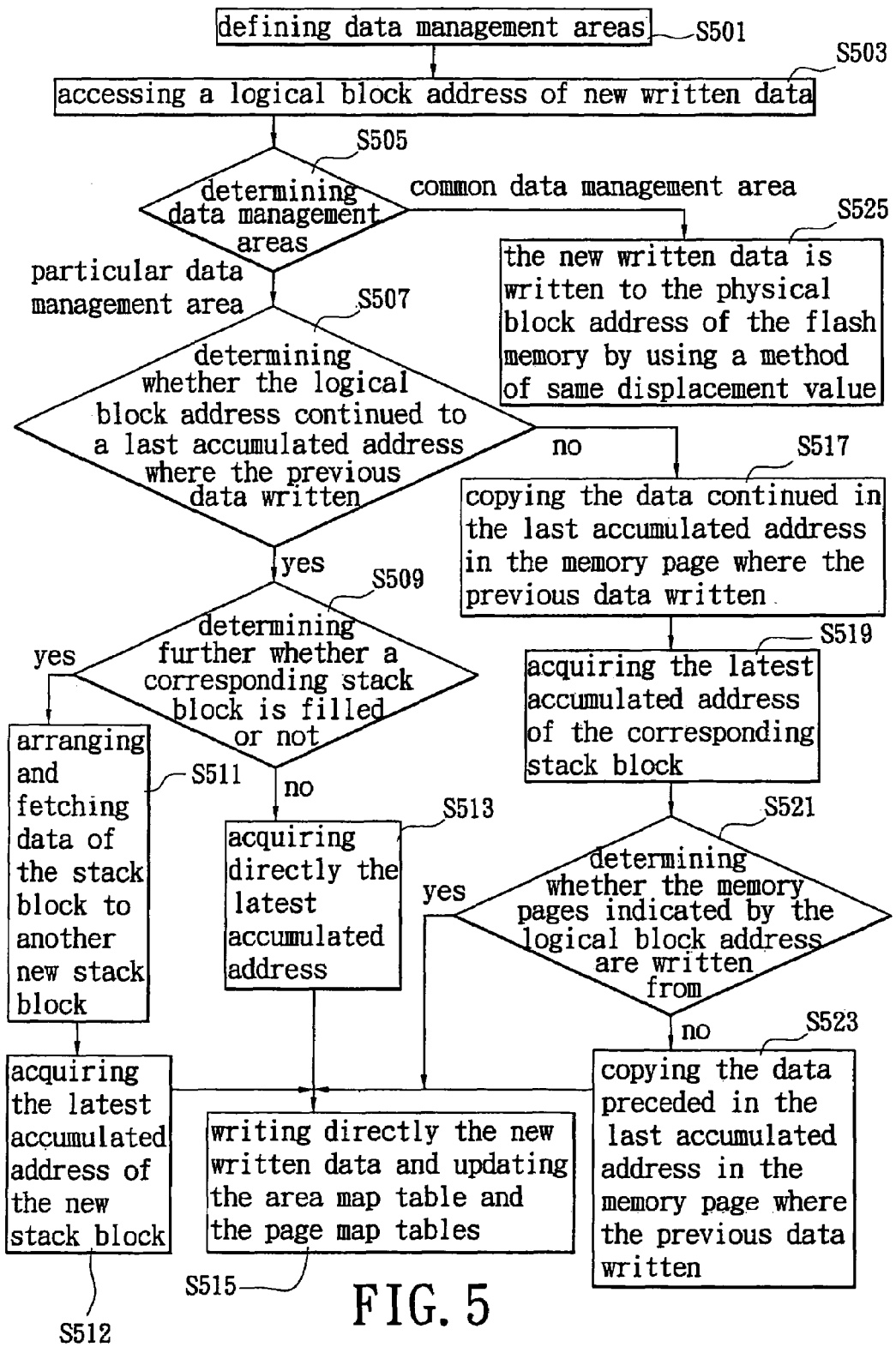
FIG. 5 is a flowchart of a first write method of a memory storage device according to the present invention.

Reference is shown as in FIG. 5 which is a flowchart of a first write method of a memory storage device according to the present invention. The present invention provides a write method of a memory storage device 1, wherein the memory storage device 1 comprises a flash memory 30, and the flash memory 30 has a plurality of memory blocks 31 and each of the memory blocks 31 has a plurality of memory pages 301, comprises the steps: defining logically the flash memory 30 as at least one particular data management area and at least one common data management area (S501); next, accessing a logical block address of new written data (S503), wherein the logical block address has memory block addresses, memory page address, and a memory sector address, and etc.; next, determining the logical block address located in the particular data management area or the common data management area by an area decision mechanism (S505), wherein the area decision mechanism is used to compare a predefined logical partition address of the particular data management area and the common data management area for determining which management area is used when receiving the logical block address of the new written data; next, determining whether the logical block address continued to a last accumulated address where the previous data written (S507) or not if the logical block address located in the particular data management area; next, determining further whether a corresponding stack block is filled or not (S509) if the logical block address continued to the last accumulated address where the previous data written, wherein the stack block has at least one memory block 31; next, arranging and fetching data of the stack block to another new stack block (S511) if the stack block is filled; next, acquiring the latest accumulated address of the new stack block according an area map table 41 and a corresponding page map table 42 (S512) to write the new written data to the physical block address corresponded to the latest accumulated address by using a method of dynamic deviation value, and updating the area map table 41 and the page map tables 42 (S515); next, acquiring directly the latest accumulated address according to the area map table 41 and the corresponding page map tables 42 (S513) if the stack block isn't filled, and writing directly the new written data to the physical block address corresponded to the latest accumulated address by using a method of dynamic deviation value, and updating the area map table 41 and the page map tables 42 (S515).

In addition, in step (S507) further comprises copying the data continued in the last accumulated address in the memory page 301 where the previous data written to take sector as a unit to the corresponding memory pages 301 indicated by the logical block address (S517) if the logical block address isn't continued to a last accumulated address where the previous data written, and acquiring the latest accumulated address of the corresponding stack block (S519); next, determining whether the memory pages 301 indicated by the logical block address are written from a first sector or not (S521); next, writing the new written data in the corresponding physical block address according to the area map table 41 and the corresponding page map tables 42 by using a method of dynamic deviation value, and updating the area map table 41 and the page map tables 42 (S515) if the memory pages 301 indicated by the logical block address are written from the first sector; next, copying the data preceded in the last accumulated address in the memory page 301 where the previous data written to take sector as a unit to the relative address of the memory pages 301 indicated by the logical block address (S523), and writing the new written data in the corresponding physical block address according to the area map table 41 and the corresponding page map tables 42 by using a method of dynamic deviation value, and updating the area map table 41 and the page map tables 42 (S515) if the memory pages 301 indicated by the logical block address aren't written from the first sector.

In the step (S505), wherein the new written data is written to the physical block address of the flash memory 30 by using a method of same displacement value according to the area map table (S525) if the logical block address located in the common data management area.

Figure 6:
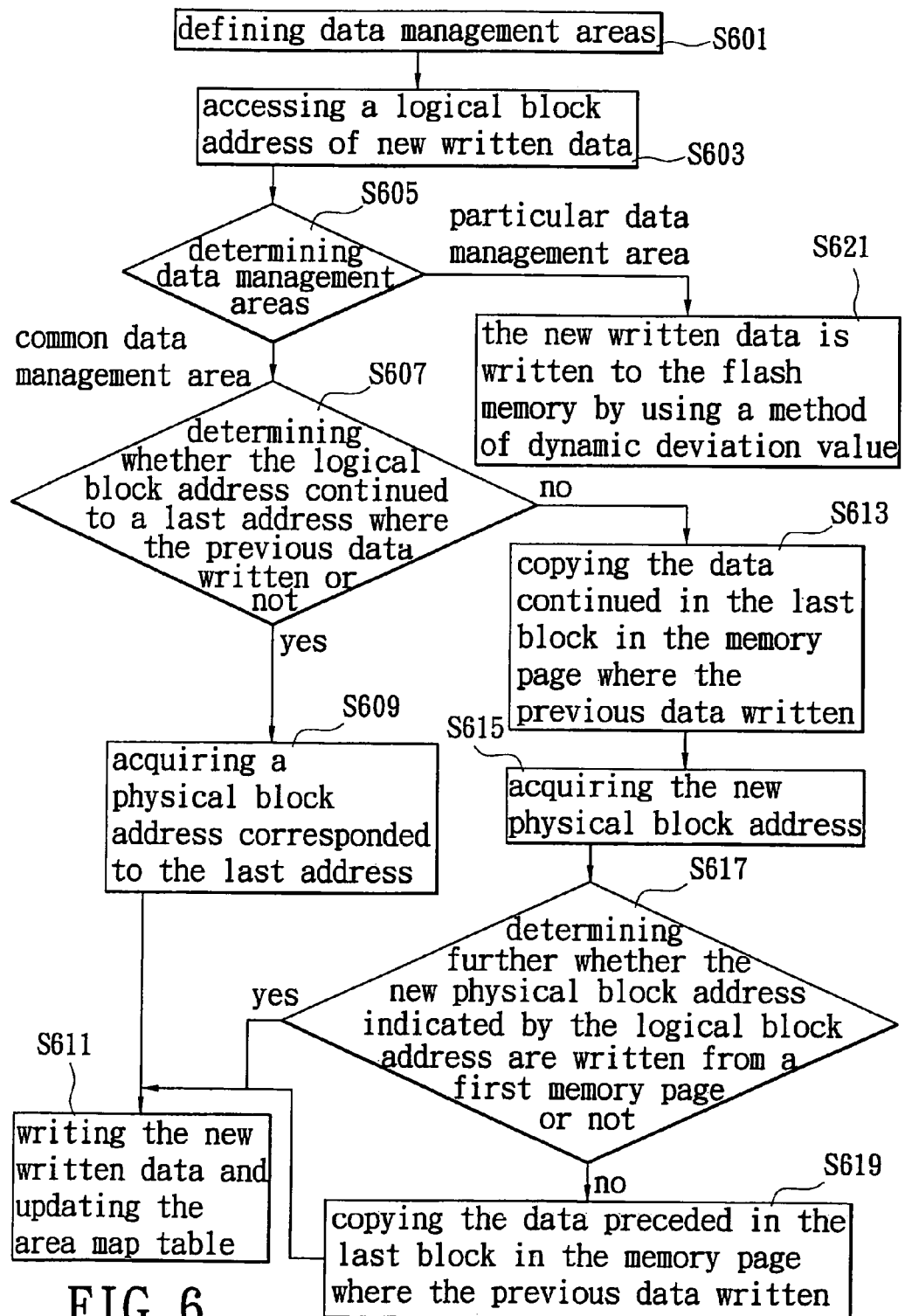
FIG. 6 is a flowchart of a second write method of a memory storage device according to the present invention.

Reference is shown as in FIG. 6 which is a flowchart of a second write method of a memory storage device according to the present invention. The steps from (S601) to (S605) are almost same as the steps from (S501) to (S505). However, in the step: determining the logical block address located in the particular data management area or the common data management area by an area decision mechanism (S605); next, determining whether the logical block address continued to a last address where the previous data written or not (S607) if the logical block address located in the common data management area; next, acquiring a physical block address corresponded to the last address according to an area map table 41 (S609), writing the new written data in the physical block address corresponded to the last address according to an area map table 41 by using a method of same displacement value, and updating the area map table 41 (S611) if the logical block address continued to the last address where the previous data written.

In addition, in step (S607) further comprises copying the data continued in the last block in the memory page 301 where the previous data written to take sector as a unit to the relative memory pages 301 indicated by the logical block address (S613), and acquiring the new physical block address by corresponding the area map table 41 (S615) if the logical block address isn't continued to a last address where the previous data written; next, determining further whether the new physical block address indicated by the logical block address are written from a first memory page or not (S617);

next, writing directly the new written data in the new physical block address by using the method of same displacement value, and updating the area map table 41 (S611) if the new physical block address indicated by the logical block address are written from the first memory page; next, copying the data preceded in the last block in the memory page 301 where the previous data written to take sector as a unit to the relative address of the new physical block address (S619), and writing the new written data in the new physical block address by using a method of same displacement value, and updating the area map table 41 (S611) if the memory pages 301 indicated by the logical block address aren't written from the first sector.

In the step (S605), wherein the new written data is written to the flash memory 30 by using a method of dynamic deviation value (S621) if the logical block address located in the common data management area.

Figure 7:
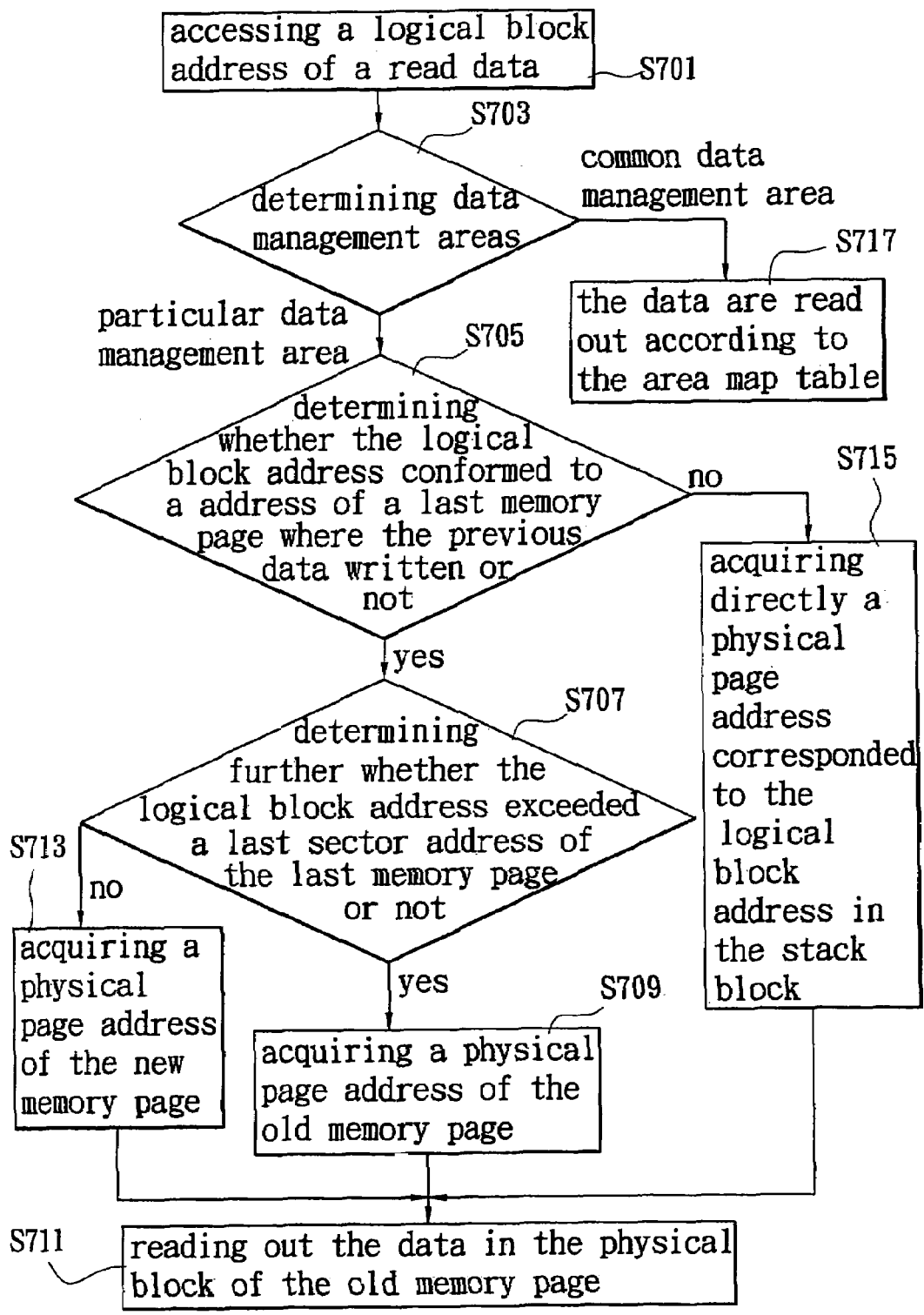
FIG. 7 is a flowchart of a first read method of a memory storage device according to the present invention.

Reference is shown as in FIG. 7 which is a flowchart of a first read method of a memory storage device according to the present invention. The present invention provides a read method of a memory storage device 1, wherein the memory storage device 1 comprises a flash memory 30, and the flash memory 30 has a plurality of memory blocks 31 and each of the memory blocks 31 has a plurality of memory pages 301, and the flash memory 30 is defined logically as at least one particular data management area and at least one common data management area, comprises the steps: accessing a logical block address of a read data (S701), wherein the logical block address has memory block addresses, memory page address, and a memory sector address, and etc.; next, determining the logical block address located in the particular data management area or the common data management area by an area decision mechanism (S703), wherein the area decision mechanism is used to compare a predefined logical partition address of the particular data management area and the common data management area for determining which management area is used when receiving the logical block address of the new written data; next, determining whether the logical block address conformed to a address of a last memory page where the previous data written or not (S705) if the logical block address located in the particular data management area; next, determining further whether the logical block address exceeded a last sector address of the last memory page or not (S707) if the logical block address conformed to the address of the last memory page where the previous data written; next, acquiring a physical page address of the old memory page according to a area map table 41 and a corresponding page map table 42 (S709), and reading out the data in the physical block of the old memory page (S711) if the logical block address is exceeded the last sector address of the last memory page to mean that the read data located in the logical block address of a old memory page; next, acquiring a physical page address of the new memory page according to the area map table 41 and the corresponding page map table 42 (S713), and reading out the data in the physical block of the new memory page (S711) if the logical block address isn't exceeded the last sector address of the last memory page to mean that the read data located in a new memory page.

In addition, the step (S705) further comprises acquiring directly a physical page address corresponded to the logical block address in the stack block according to the area map table 41 and the corresponding page map table 42 (S715), and reading out the data in the physical block of the stack block (S711) if the logical block address isn't conformed to the address of the last memory page where the previous data written.

In the step (S703), the data are read out according to the area map table 41 (S717) if the logical block address located in the common data management area.

Figure 8:
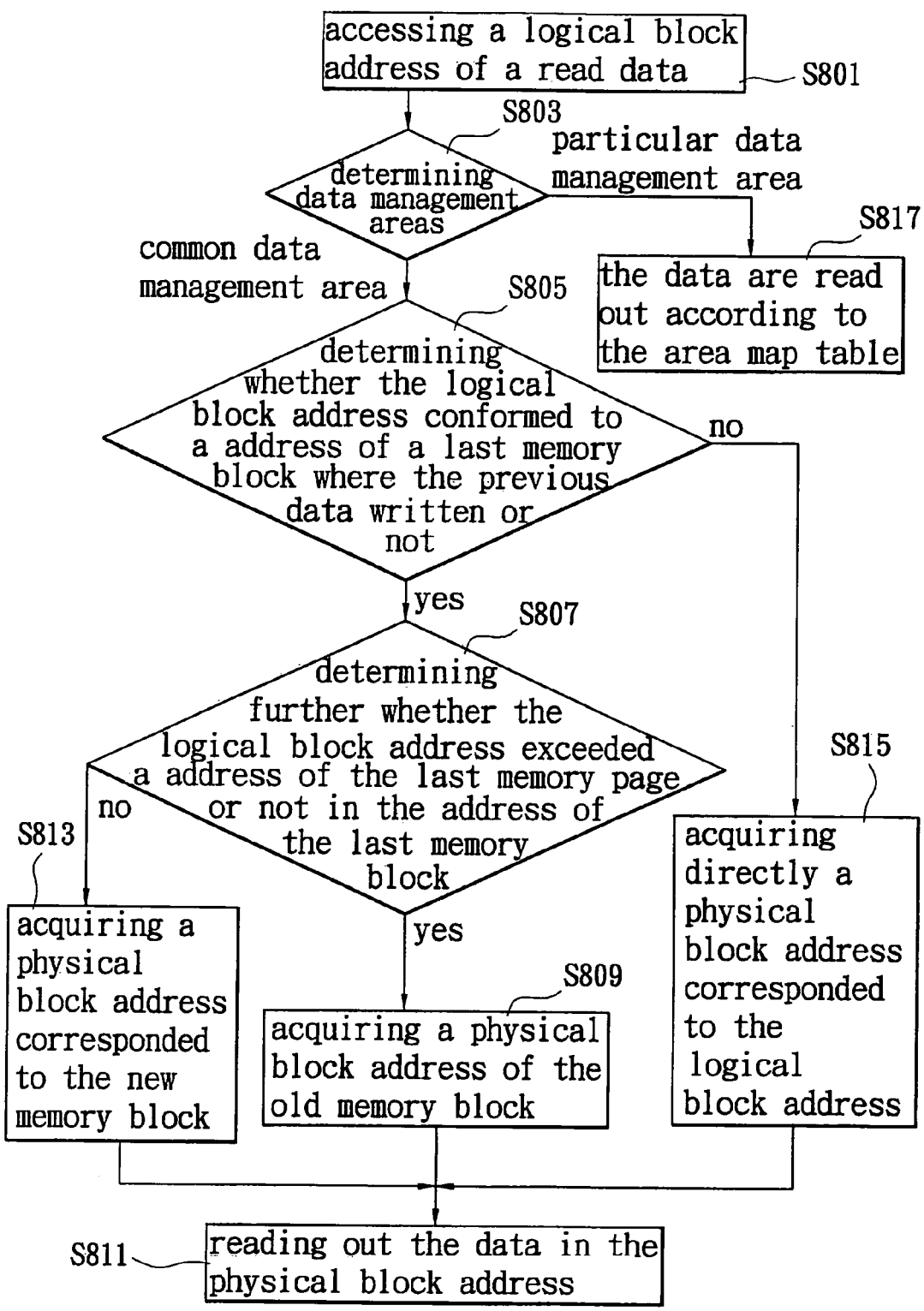
FIG. 8 is a flowchart of a second read method of a memory storage device according to the present invention.

Reference is shown as in FIG. 8 which is a flowchart of a second write method of a memory storage device according to the present invention. The steps from (S801) to (S803) are almost same as the steps from (S701) to (S703). However, in the step: determining the logical block address located in the particular data management area or the common data management area by an area decision mechanism (S803); next, determining whether the logical block address conformed to a address of a last memory block where the previous data written or not (S805) if the logical block address located in the common data management area; next, determining further whether the logical block address exceeded a address of the last memory page or not in the address of the last memory block (S807) if the logical block address conformed to the address of the last memory block where the previous data written; next, according to a area map table 41 (S809), and reading out the data in the physical block address (S811) if the logical block address is exceeded the address of the last memory page to mean that the read data located in a old memory block; next, acquiring a physical block address corresponded to the new memory block according to the area map table 41 (S813), and reading out the data in the physical block address (S811) if the logical block address isn't exceeded the address of the last memory page to mean that the read data located in a new memory block.

In addition, the step (S805) further comprises according to the area map table 41 (S815), and reading out the data in the physical block address (S811) if the logical block address isn't conformed to the address of the last logical block where the previous data written.

In the step (S803), the data are read out according to the area map table 41 and the corresponding page map table 42 (S817) if the logical block address located in the particular data management area.

Additionally, the above-mentioned area map table 41 and the page map tables 42 are used mainly to map relation between the logical block address and the physical block address. The two tables need to be used when the physical block address needs to be acquired in any condition.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A memory storage device is adapted to read/write data with an external system, comprising:

a flash memory adapted to store the read/written data, the flash memory having a plurality of memory blocks, each of the memory blocks having a plurality of memory pages, and the memory blocks distinguished into at least one particular data management area and at least one common data management area in logical block address; and a control unit, further comprising:

an area map table adapted to map the logical block address and physical block address of the memory blocks; and a plurality of page map tables produced by each of the memory blocks and adapted to relate the logical block address and the physical block address of the memory pages;

wherein the control unit writing data to the memory pages of the memory blocks in the particular data management area according to the area map table and the corresponding page map tables by using a method of dynamic deviation value, and updating the corresponding area map table and the page map tables to be read and written later.

2. The memory storage device as claimed in claim 1, wherein the control unit further comprises:

a system terminal interface is used to transmit data between the control unit and the external system;

a microprocessor is used to execute relative operations of reading, writing, and erasing according to the area map table and the page map tables; and a memory interface is a data transmission channel between the control unit and the flash memory.

3. The memory storage device as claimed in claim 1, wherein the particular data management area and the common data management area are distributed according to frequencies of data read or moved.

4. The memory storage device as claimed in claim 1, wherein the common data management area written that is the control unit writes data to the memory blocks in the common data management area by using a method of same displacement value according to the area map table by the control unit, and updating the corresponding area map table to be read and written later.

5. The memory storage device as claimed in claim 1, wherein the logical block address of each of the memory pages of the page map tables corresponds to at least one physical block address.

6. A write method of a memory storage device, wherein the memory storage device comprises a flash memory, and the flash memory has a plurality of memory blocks and each of the memory blocks has a plurality of memory pages, comprising the steps:

defining logically the flash memory as at least one particular data management area and at least one common data management area;

accessing a logical block address of new written data;

determining the logical block address located in the particular data management area or the common data management area by an area decision mechanism;

determining whether the logical block address continued to a last accumulated address where the previous data written or not if the logical block address located in the particular data management area;

determining further whether a corresponding stack block is filled or not if the logical block address continued to the last accumulated address where the previous data written;

arranging and fetching data of the stack block to another new stack block, acquiring the latest accumulated address of the new stack block according an area map table and a corresponding page map table to write the new written data to the physical block address corresponded to the latest accumulated address by using a method of dynamic deviation value, and updating the area map table and the page map tables if the corresponding stack block is filled; and acquiring directly the latest accumulated address according to the area map table and the corresponding page map tables, writing directly the new written data to the physical block address corresponded to the latest accumulated address by using a method of dynamic deviation value, and updating the area map table and the page map tables if the corresponding stack block isn't filled.

7. The write method of a memory storage device as claimed in claim 6, wherein the area decision mechanism is used to compare a predefined logical partition address of the particular data management area and the common data management area.

8. The write method of a memory storage device as claimed in claim 6, wherein the new written data is written to the physical block address of the flash memory by using a method of same displacement value according to the area map table if the logical block address located in the common data management area.

9. The write method of a memory storage device as claimed in claim 6, further comprising:

copying the data continued in the last accumulated address in the memory page where the previous data written to take sector as a unit to the corresponding memory pages indicated by the logical block address, and acquiring the latest accumulated address of the corresponding stack block if the logical block address isn't continued to a last accumulated address where the previous data written;

determining whether the memory pages indicated by the logical block address are written from a first sector or not;

writing the new written data in the corresponding physical block address according to the area map table and the corresponding page map tables by using a method of dynamic deviation value, and updating the area map table and the page map tables if the memory pages indicated by the logical block address are written from the first sector; and copying the data preceded in the last accumulated address in the memory page where the previous data written to take sector as a unit to the relative address of the memory pages indicated by the logical block address, and writing the new written data in the corresponding physical block address according to the area map table and the corresponding page map tables by using a method of dynamic deviation value, and updating the area map table and the page map tables if the memory pages indicated by the logical block address aren't written from the first sector.

10. A write method of a memory storage device, wherein the memory storage device comprises a flash memory, and the flash memory has a plurality of memory blocks and each of the memory blocks has a plurality of memory pages, comprising the steps:

defining logically the flash memory as at least one particular data management area and at least one common data management area;

accessing a logical block address of new written data;

determining the logical block address located in the particular data management area or the common data management area by an area decision mechanism;

determining whether the logical block address continued to a last address where the previous data written or not if the logical block address located in the common data management area; and acquiring a physical block address corresponded to the last address according to an area map table, writing the new written data in the physical block address corresponded to the last address according to an area map table by using a method of same displacement value, and updating the area map table if the logical block address continued to the last address where the previous data written.

11. The write method of a memory storage device as claimed in claim 10, wherein the area decision mechanism is used to compare a predefined logical partition address of the particular data management area and the common data management area.

12. The write method of a memory storage device as claimed in claim 10, wherein the new written data is written to the physical block address corresponded to a last accumulated address of a stack block by using a method of dynamic deviation value according to the area map table and the corresponding page map tables if the logical block address located in the particular data management area.

13. The write method of a memory storage device as claimed in claim 10, further comprising:
  copying the data continued in the last block in the memory page where the previous data written to take sector as a unit to the relative memory pages indicated by the logical block address, and acquiring the new physical block address by corresponding the area map table if the logical block address isn't continued to a last address where the previous data written;
  determining further whether the new physical block address indicated by the logical block address are written from a first memory page or not;
  writing directly the new written data in the new physical block address by using the method of same displacement value, and updating the area map table if the new physical block address indicated by the logical block address are written from the first memory page; and
  copying the data preceded in the last block in the memory page where the previous data written to take sector as a unit to the relative address of the new physical block address, and writing the new written data in the new physical block address by using a method of same displacement value, and updating the area map table if the memory pages indicated by the logical block address aren't written from the first sector.

14. A read method of a memory storage device, wherein the memory storage device comprises a flash memory, the flash memory has a plurality of memory blocks and each of the memory blocks has a plurality of memory pages, and the flash memory is defined logically as at least one particular data management area and at least one common data management area, comprising the steps:
  accessing a logical block address of a read data;
  determining the logical block address located in the particular data management area or the common data management area by an area decision mechanism;
  determining whether the logical block address conformed to a address of a last memory page where the previous data written or not if the logical block address located in the particular data management area;
  determining further whether the logical block address exceeded a last sector address of the last memory page or not if the logical block address conformed to the address of the last memory page where the previous data written;
  acquiring a physical page address of the old memory page according to a area map table and a corresponding page map table, and reading out the data in the physical block of the old memory page if the logical block address is exceeded the last sector address of the last memory page to mean that the read data located in the logical block address of a old memory page; and
  acquiring a physical page address of the new memory page according to the area map table and the corresponding page map table, and reading out the data in the physical block of the new memory page if the logical block address isn't exceeded the last sector address of the last memory page to mean that the read data located in a new memory page.

15. The read method of a memory storage device as claimed in claim 14, wherein the area decision mechanism is used to compare a predefined logical partition address of the particular data management area and the common data management area.

16. The read method of a memory storage device as claimed in claim 14, wherein the data are read out according to the area map table if the logical block address located in the common data management area.

17. A read method of a memory storage device, wherein the memory storage device comprises a flash memory, the flash memory has a plurality of memory blocks and each of the memory blocks has a plurality of memory pages, and the flash memory is defined logically as at least one particular data management area and at least one common data management area, comprising the steps:
  accessing a logical block address of a read data;
  determining the logical block address located in the particular data management area or the common data management area by an area decision mechanism;
  determining whether the logical block address conformed to a address of a last memory block where the previous data written or not if the logical block address located in the common data management area;
  determining further whether the logical block address exceeded a address of the last memory page or not in the address of the last memory block if the logical block address conformed to the address of the last memory block where the previous data written;
  acquiring a physical block address of the old memory block according to a area map table, and reading out the data in the physical block address if the logical block address is exceeded the address of the last memory page to mean that the read data located in a old memory block; and
  acquiring a physical block address corresponded to the new memory block according to the area map table, and reading out the data in the physical block address if the logical block address isn't exceeded the address of the last memory page to mean that the read data located in a new memory block.

18. The read method of a memory storage device as claimed in claim 17, wherein the area decision mechanism is used to compare a predefined logical partition address of the particular data management area and the common data management area.

19. The read method of a memory storage device as claimed in claim 17, wherein the data are read out according to the area map table and the corresponding page map table if the logical block address located in the particular data management area.

20. The read method of a memory storage device as claimed in claim 17, further comprising:
  acquiring directly a physical block address corresponded to the logical block address according to the area map table, and reading out the data in the physical block address if the logical block address isn't conformed to the address of the last logical block where the previous data written.

* * * * *